United States Patent [19]
Okrent et al.

[11] 3,861,998

[45] Jan. 21, 1975

[54] METHOD OF OPERATING A NEUTRONIC REACTOR

[75] Inventors: Eugene H. Okrent, Bellevue, Wash.; Barry L. Tarmy, Berkeley Heights, N.J.

[73] Assignee: Exxon Research and Engineering Company, Linden, N.J.

[22] Filed: May 23, 1973

[21] Appl. No.: 363,041

Related U.S. Application Data
[63] Continuation of Ser. No. 55,423, July 17, 1970, abandoned.

[52] U.S. Cl. .................................. 176/37, 176/49
[51] Int. Cl. .............................................. G21c 1/22
[58] Field of Search ............... 176/37, 49, 17, 18

[56] References Cited
UNITED STATES PATENTS

| | | | |
|---|---|---|---|
| 2,758,023 | 8/1956 | Bareis | 176/49 |
| 3,029,142 | 4/1962 | Coffinberry | 176/49 |
| 3,262,856 | 7/1966 | Bettis | 176/49 |
| 3,278,387 | 10/1966 | McNeese et al. | 176/49 |

*Primary Examiner*—Harvey E. Behrend
*Attorney, Agent, or Firm*—Joseph J. Dvorak

[57] ABSTRACT

A novel system and method of operating a fluid fuel nuclear reactor is provided in which heat for power generation is transferred directly from the fluid fuel to a purge material while the purge material simultaneously sweeps neutron-absorbing fission products from the fluid fuel.

7 Claims, 1 Drawing Figure

PATENTED JAN 21 1975

3,861,998

Eugene H. Okrent
Barry L. Tarmy   INVENTORS

BY *Joseph J. Dvorak* ATTORNEY

METHOD OF OPERATING A NEUTRONIC REACTOR

This is a continuation of application Ser. No. 55,423 filed July 17, 1970 and now abandoned.

BACKGROUND OF THE INVENTION

This invention relates generally to fluid fuel nuclear reactor systems. More specifically, this invention relates to a novel system and improved method of operating single fluid circulating fuel reactors. Even more specifically, this invention is concerned with improvements in operating thermal molten salt breeder and converter reactors.

The term "reactor core", as used herein, shall mean the inner region of a nuclear reactor which contains fissile material and is characterized by multiplication constant greater than unity.

The term "conversion ratio" shall mean the ratio of the number of fissile atoms produced to the number of fissile atoms that have been consumed. It shall be understood that the conversion ratio shall be greater than 1 in a "breeder reactor" and less than 1 in a "converter reactor". In a high gain converter reactor the conversion ratio is about 0.90 to 1.0.

The term "fertile material" shall mean any material that can be converted into a fissile material by absorption of neutrons. "Fissile material" means material which will undergo fission by absorption of neutrons.

For the purpose of this invention a "single fluid reactor" shall be understood to mean a nuclear reactor in which the fissile and fertile materials are uniformly mixed and in which only one fuel salt composition is used throughout the entire reactor core and blanket region.

The "blanket region" refers to that region within the reactor core which contains fertile material for conversion of the fissile material by neutron capture.

Circulating fuel reactors have a number of advantages deriving from the fact that the fuel is in a fluid state. In circulating fuel reactors, a fluid fuel is circulated through the reactor and external heat exchange equipment by natural or forced connection. Heat is transferred from the fuel to a coolant in equipment external to the reactor core for ultimate use for power generation. Consequently, design of heat exchange equipment is greatly simplified compared with systems in which heat is transferred from the fluid fuel to a coolant in the reactor core. Additionally, fuel purification is simplified and high burn-up of fuel is achieved. Mechanical designs are possible which can eliminate a number of control elements and moving parts. These and other advantages of circulating fuel nuclear reactor systems are well known.

Notwithstanding the relative simplicity and design and operation of circulating fuel nuclear reactor systems, a number of critical requirements must nonetheless be met if practical operation is to be achieved. For example, breeder reactor theory requires no more than two neutrons for each fission of fissile material — one neutron to sustain neutron chain reaction in the reactor and the other neutron for converting fertile material into fissile material. As a practical matter, however, the breeding ratio generally must be maintained at a sufficiently high level and numerous precautions must be undertaken to avoid the loss of neutrons by escape or parasitic capture. Similar precautions must be undertaken in the design of high gain converter reactors.

In single fluid circulating fuel reactor systems, typically thorium is used as the fertile material to generate neutron fissionable isotopes such as $U^{233}$, $U^{235}$, and $Pu^{239}$. Generally, the thorium is present in a complex molten fluoride salt mixture which includes uranium fuel.

Practical operation of single fluid circulating fuel systems requires that the system fissile inventory be kept low while the breeding ratio be maintained as high as possible. In order to meet these requirements, a purge gas is introduced into the reactor core to free the molten salts of fission products which will absorb neutrons, e.g. $Xe^{135}$, and which will ultimately limit the breeding ratio and increase the fissile inventory.

A disadvantage in sweeping fission products from the nuclear reactor with a gas resides in the limited amount of purge gas that may be introduced in the reactor core. Extensive use of purge gas in the reactor core lowers the fuel volume. Since low fuel volume decreases thermal efficiency and increases fuel inventory requirements, low fuel volume is undesirable. On the other hand, using relatively small amounts of purge gas limits the extent of removal of neutron parasites possible. Failure to adequately remove extraneous neutron absorbers or parasites undesirably affects the breeding ratio, fuel efficiency and specific power of the system.

Additionally, in the design of molten salt reactor systems, heat is transferred from the primary coolant, i.e. the molten salt, to a secondary coolant, such as sodium fluoroborate, by the use of tube type heat exchanger. The secondary coolant is used in the energy conversion process, for example, to power a supercritical steam generator. Obviously, difficulties are encountered in the design, startup and shutdown of conventional tube type heat transfer systems utilizing corrosive molten materials as heat transfer media.

SUMMARY OF THE INVENTION

According to this invention, a new and improved process for operating molten salt breeder and converter reactors is provided. The improvement is accomplished generally by withdrawing molten fuel salt from the reactor core and introducing the molten fuel salt in an entrainment zone in which a purge material is contacted with the molten salt to purge or sweep out fission products while simultaneously heat is transferred from the molten salt to the purge material without the use of a heat exchanger. The molten fuel salt is then returned to the reactor core.

The purge material after passing out of the entrainment zone is transferred to a steam power generation zone where it is used to provide steam to power a high pressure steam turbine.

Subsequently, the purge material is treated for fission product removal and recycled to the entrainment zone.

Additionally, in accordance with the present invention, a portion of the molten fuel salt is continuously circulated through a chemical processing zone for recovery and removal of protactinium and rare earth fission products.

DESCRIPTION OF THE PREFERRED EMBODIMENTS

Figure 1:
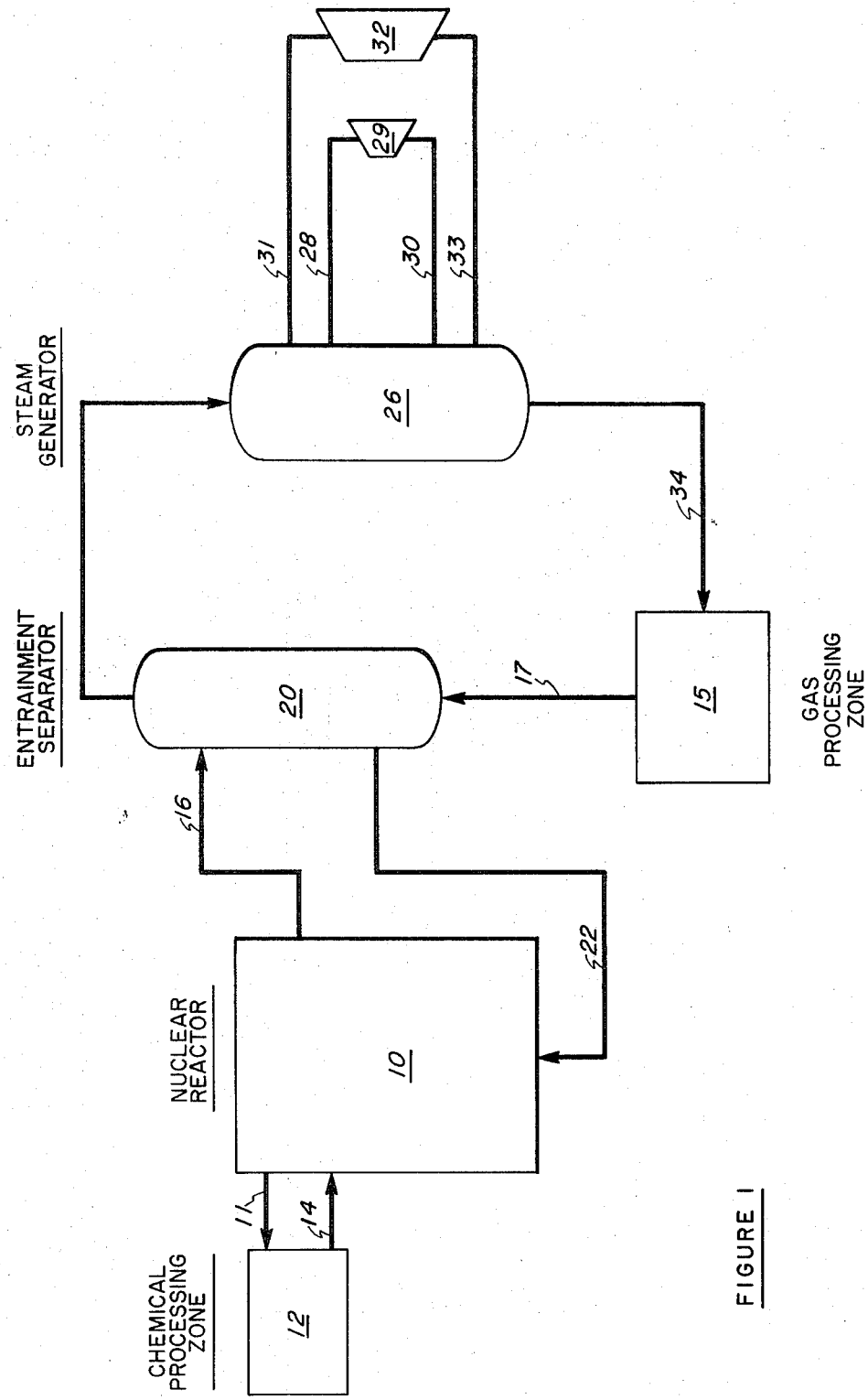
FIG.1 shows schematically the method of operating a molten salt breeder reactor in accordance with the present invention.

Referring to FIG. 1, a nuclear reactor is diagrammatically illustrated at 10. Lines 16 and 22 are provided for circulating molten salt from reactor 10 through entrainment separator 20. Lines 11 and 14 are provided for circulating a portion of the molten fuel from reactor 10 through chemical processing zone 12.

In the entrainment cooling system, line 17 of entrainment separator 20 is connected to the discharge side of the entrainment-purification zone 15. Entrained vapors exit separator 20 via line 23 and pass through steam generator 26 where the vapors are cooled. The cooled vapors then pass via line 34 to processing zone 15.

Also shown in FIG. 1 are low pressure lines 31 and 33 communicating with the steam generator 26 and a low pressure turbine 32. High pressure lines 28 and 30 are provided and complete the cycle between the steam generator 26 and high pressure turbine 29.

In accordance with the present invention, nuclear reactor 10 is a single fluid molten salt graphite moderated reactor in which breeding is accomplished by adjusting the moderator to fuel ratio radially and axially to provide a breeding blanket region.

The fuel salt contains thorium as the fertile material and uranium as the fissile material in a complex mixture containing beryllium and lithium fluorides.

A typical fuel salt composition is given in Table I along with the preferred fuel salt composition in accordance with this invention.

TABLE I

| Salt | CONCENTRATION | |
|---|---|---|
| | Generally, Mole % | Preferred Mole % |
| $ThF_4$ | 8 – 16 | 12 |
| $UF_4$ | 0.2–0.5 | 0.3 |
| $BeF_2$ | 15 – 25 | 16 |
| $LiF_4$ | 60 – 80 | 71.7 |

The fuel salt is heated in the reactor core by the fission reaction. Excess neutrons are absorbed by thorium which is thereby converted to fissile materials, such as $U^{233}$. The fissile material then undergoes fission and a self-sustained chain reaction is established.

To maintain the fission reaction, parasitic neutron absorbing materials such as $Xe^{135}$ must be substantially removed from the mixture of fissile and fertile materials during neutron bombardment.

Additionally, the fission reaction generates tremendous heat and the molten salt temperature must be controlled. Typically, the temperature of the molten salt in the reactor is in excess of 950°F. and generally is between 1100°F. and 1400°F.

Accordingly, temperature control and removal of parasitic neutron materials are accomplished simultaneously in a manner to be more fully described below.

Molten fuel salt at a temperature of about 1300°F. is circulated via line 16 to entrainment separator 20. Preferably, the salt is circulated continuously through separator 20 and back to reactor 10.

In entrainment separator 20, poisoning or neutron absorbent materials in the molten salt are swept from the salt with an immiscible purge material introduced via line 17.

In entrainment separator 20 the purge material contacts the molten salt, cooling the salt directly, without the use of a heat exchanger. Preferably, the molten salt is cooled to at least below 1100°F. and more preferably to the range of about 1000°F. to about 1100°F.

Thus, the purge material serves a dual purpose. Molten salt is cooled by direct contact with the purge material while simultaneously volatile parasitic or neutron absorbing materials such as $Xe^{135}$ and noble metal fission products are entrained with the purge material and removed from the molten salt.

The purge material must be immiscible in, but compatible with, the fused salt and have physical and nuclear properties which permit its use under reactor operating conditions. Important nuclear physical properties include radiation stability, vapor pressure, melting point and thermal conductivity. Immiscible and vaporizable materials suitable generally are inert gases. Typical gases which can be used in direct contact with molten salt for removal of volatile fission products include helium, argon, and silicon tetrafluoride. Preferably, helium is used in the practice of this invention.

Depending upon the size of the entrainment separator and the efficiency of the contact between the injected entrainment material and the molten salt, optionally, purge material may be injected into the nuclear reactor 10 for removal of fission products. Preferably, however, complete removal of heat and fission products are accomplished in the entrainment separator 20.

One of the advantages of simultaneously cooling and purging the molten salt in an entrainment zone is that displacement of fuel with purge gas in the reactor core is circumvented. Additionally, this invention permits relatively greater amounts of purge gas to be used, thereby making it possible to reduce the presence of fission products present in the molten salt to the lowest possible level.

In any event, the molten salt is purged of volatile fission products in entrainment separator 20 while simultaneously it is cooled to lower temperatures in the range of about 1000° to 1100°F. Preferably, the molten salt exits from the entrainment separator at a temperature of about 1050°F. and is returned via line 22 to nuclear reactor 10.

Entrainment material, including volatile fission products, exits separator 20 via line 23 and is used to power a steam generator 26, for example. The entrainment gas then exits steam generator 26 via line 34 at a lower temperature and is treated in gas processing zone 15 for removal of entrained fission products prior to return to entrainment separator 20 via line 17. Alternatively, the purge material exiting separator 20 via line 23 is processed for removal of entrained fission products prior to being introduced into steam generator 26.

The entrainment material may be separated from fissionable material in zone 15 by any number of known processing methods. For example, the mixture of volatile fission products and carrier can be passed through a charcoal trap. Long-lived gaseous fission products are absorbed by the charcoal and decay there. Alternately, and preferably, a bismuth spray is used to remove the noble fission products, ruthenium, molybdenum and rhodium while a holdup system is used to decontaminate the $Xe^{135}$.

An additional feature of the present invention contemplates circulating molten fuel via lines 11–14 through chemical processing zone 12, for recovery in removal of the nonvolatile fission products such as rare earth and protactinium fission products. In order to keep their poisoning effect relatively low, preferably the molten salt stream is continuously circulated and processed in zone 12. Methods for chemically processing nuclear fuels to remove nonvolatile fission products are well known in the art.

As mentioned previously, heated purge material exiting zone 20 via line 23 is used to power the steam generating system shown schematically in FIG. 1. The typical steam generating system illustrated comprises a single pass boiler or steam generator 26 in which feed water is introduced via lines 30 and 33. The water flows countercurrent to the flow of heated entrainment material. As the water flows through the boiler, it is heated, vaporized and finally superheated. Exhaust steam is passed via lines 31 and 28 to gas turbines 29 and 32.

What is claimed is:

1. A process for operating a fluid molten salt graphite moderated nuclear breeder reactor comprising the steps of:
   a. withdrawing fluid fuel from the reactor core;
   b. introducing said withdrawn fuel in an entrainment zone;
   c. contacting said fuel in said entrainment zone with a volatile purge material, said purge material being immiscible in and compatible with said fluid fuel, whereby volatile fission products are entrained by the purge material and are swept from the fuel with said purge material while heat is simultaneously transferred to the purge material from the fuel;
   d. returning said fuel from the entrainment zone to the reactor core; and
   e. introducing the purge material from the entrainment zone into a steam generator for producing steam.

2. The process of claim 1 wherein fuel is continuously withdrawn, circulated, contacted and returned to the reactor core.

3. The process of claim 1 wherein the fuel is withdrawn at a temperature in the range of from about 1100°F. to about 1400°F. and is returned to the core at a temperature in the range of about 1000°F. to about 1100°F.

4. The process of claim 1 wherein the fuel is a molten salt containing thorium and uranium.

5. The process of claim 1 including the step of circulating at least a portion of said fuel through a chemical processing zone wherein nonvolatile fission products are removed from said fuel.

6. The process of claim 1 wherein the purge material is helium.

7. The process of claim 1 wherein the purge material is treated to remove entrained fission products and recycled to the entrainment zone.

* * * * *